(12) United States Patent
Zeutenhorst

(10) Patent No.: US 12,472,864 B2
(45) Date of Patent: Nov. 18, 2025

(54) VEHICLE WHEEL LATERAL CHOCK DEVICE

(71) Applicant: Randy Zeutenhorst, Winterset, IA (US)

(72) Inventor: Randy Zeutenhorst, Winterset, IA (US)

( * ) Notice: Subject to any disclaimer, the term of this patent is extended or adjusted under 35 U.S.C. 154(b) by 570 days.

(21) Appl. No.: 17/943,618

(22) Filed: Sep. 13, 2022

(65) Prior Publication Data

US 2024/0083330 A1    Mar. 14, 2024

(51) Int. Cl.
*B60P 3/077* (2006.01)
*B60T 3/00* (2006.01)
*B62H 3/08* (2006.01)

(52) U.S. Cl.
CPC .............. *B60P 3/077* (2013.01); *B60T 3/00* (2013.01); *B62H 3/08* (2013.01)

(58) Field of Classification Search
CPC .............. B60T 3/00; B60P 3/077; B62H 3/08
USPC ....................................................... D12/217
See application file for complete search history.

(56) References Cited

U.S. PATENT DOCUMENTS

| 4,280,712 | A | * | 7/1981 | Clark ................ | B62D 33/0215 |
|---|---|---|---|---|---|
| | | | | | 280/414.1 |
| 6,193,078 | B1 | * | 2/2001 | Stuhlmacher ............ | B62H 3/00 |
| | | | | | 248/176.1 |
| 6,331,094 | B1 | | 12/2001 | Burrows | |
| 6,863,481 | B2 | | 3/2005 | Pingel | |
| 6,966,734 | B2 | | 11/2005 | Toteff | |
| 7,150,359 | B1 | | 12/2006 | Lyons | |
| 7,581,623 | B1 | * | 9/2009 | Egnor ..................... | B60T 3/00 |
| | | | | | 188/32 |
| 8,690,503 | B2 | | 4/2014 | Chamoun | |
| 9,409,508 | B2 | | 8/2016 | Graham | |
| 11,358,512 | B2 | | 6/2022 | Reyes-Crespo | |
| 2006/0169861 | A1 | * | 8/2006 | Williams ............... | B62K 3/002 |
| | | | | | 248/346.4 |
| 2006/0237376 | A1 | * | 10/2006 | Eakin ..................... | B60P 3/077 |
| | | | | | 211/20 |

FOREIGN PATENT DOCUMENTS

| AU | 2010100351 A4 | * | 5/2010 | .............. B62H 3/08 |
|---|---|---|---|---|
| CA | 2729670 | | 6/2009 | |
| DE | 2829615 A | * | 1/1980 | .............. B60P 3/077 |
| FR | 2694260 B3 | * | 10/1994 | .............. B62H 5/14 |
| GB | 2557330 A | * | 6/2018 | .............. B62H 5/145 |
| GB | 2591443 A | * | 8/2021 | ................ B60P 7/13 |

OTHER PUBLICATIONS

JS Jacks; J&S Jacks Motorcycle Wheel Chock, https://www.youtube.com/watch?v=JLRSRMGVRK8; accessed Mar. 26, 3035; published Oct. 22, 2012. (Year: 2012).*

YouMotorcycle; Kafe Adjustable Motorcycle Wheel Chock; https://youmotorcycle.com/kafe-adjustable-motorcycle-wheel-chock-review.html; accessed on Mar. 26, 2025; published May 24, 2016. (Year: 2016).*

* cited by examiner

*Primary Examiner* — Daniel J Colilla

(57) ABSTRACT

A vehicle wheel lateral chock device includes a base plate having a bottom surface and an upper surface. Each of a pair of side plates is coupled to the base plate. The side plates extend upwardly from the upper surface of the base plate. The side plates are parallel to each other and spaced apart on the base plate to define a seat channel configured to receive a vehicle wheel between the side plates. The side plates are configured for inhibiting lateral movement of the vehicle wheel on the base plate.

1 Claim, 6 Drawing Sheets

VEHICLE WHEEL LATERAL CHOCK DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to chock devices and more particularly pertains to a new chock device for allowing a front wheel of a vehicle to pass through the device prior to positioning a rear wheel of the vehicle such that the device inhibits lateral movement of the rear wheel of the vehicle.

(2) Description of Related Art Including Information Disclosed Under 37 CFR 1.97 and 1.98

The prior art relates to chock devices. Known chock devices lack a pass through channel to facilitate alignment by allowing a front wheel of a vehicle to pass through the device prior to positioning a rear wheel of the vehicle such that the device inhibits lateral movement of the rear wheel of the vehicle.

BRIEF SUMMARY OF THE INVENTION

An embodiment of the disclosure meets the needs presented above by generally comprising a base plate having a bottom surface and an upper surface. Each of a pair of side plates is coupled to the base plate. The side plates extend upwardly from the upper surface of the base plate. The side plates are parallel to each other and spaced apart on the base plate to define a seat channel configured to receive a vehicle wheel between the side plates. The side plates are configured for inhibiting lateral movement of the vehicle wheel on the base plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
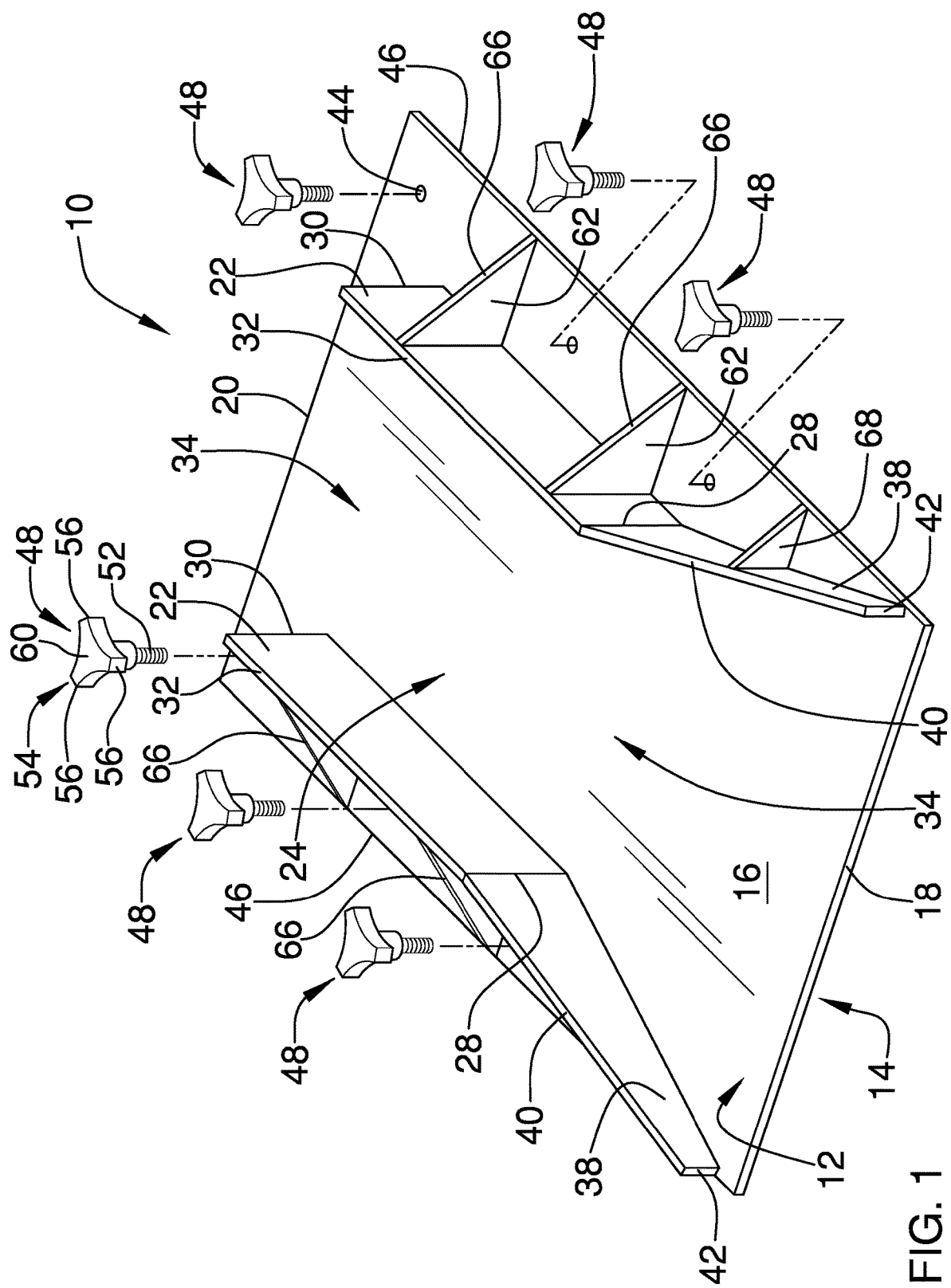
FIG. 1 is an exploded top front side perspective view of a vehicle wheel lateral chock device according to an embodiment of the disclosure.
Figure 2:
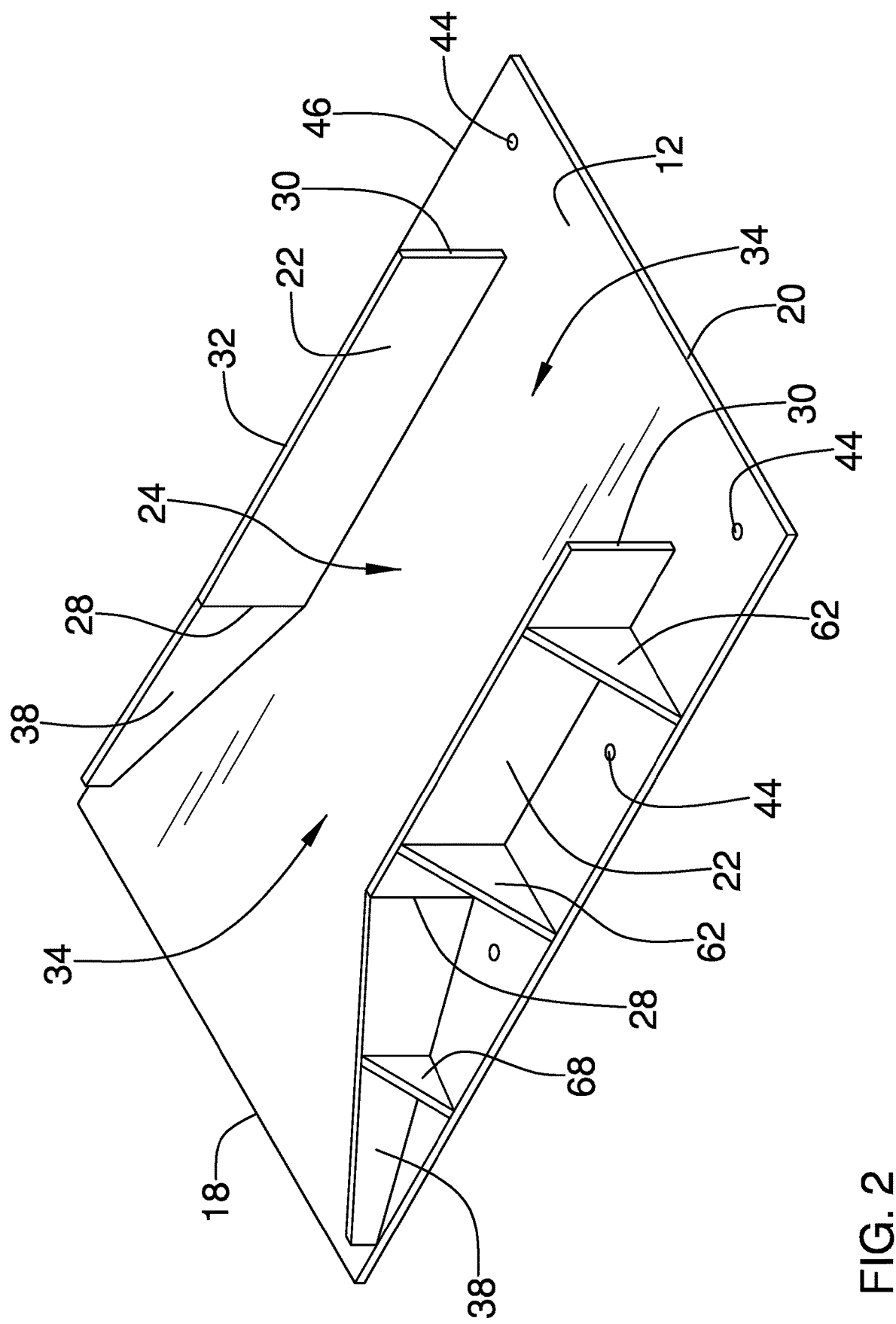
FIG. 2 is a top rear side perspective view of an embodiment of the disclosure.
Figure 3:
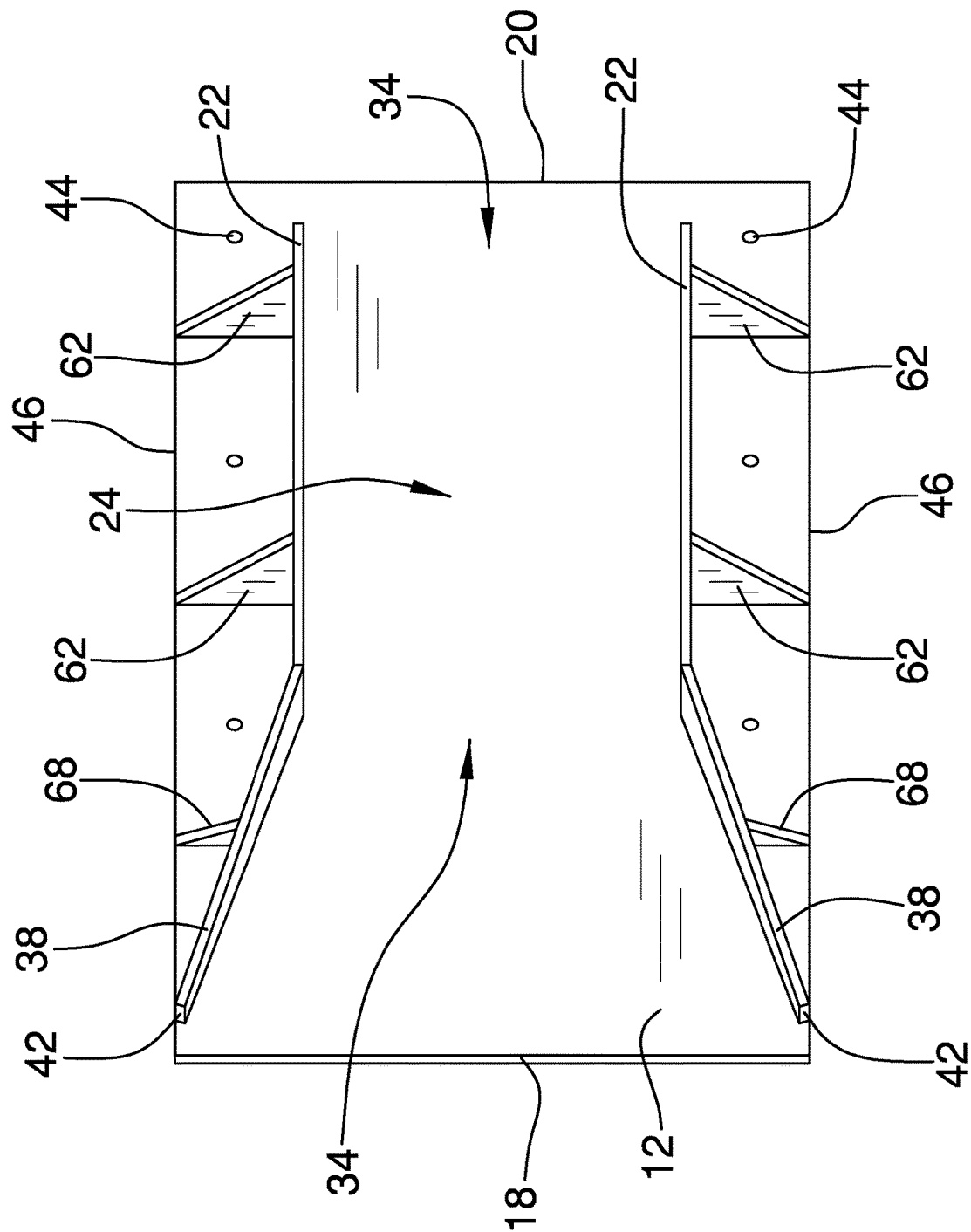
FIG. 3 is a top view of an embodiment of the disclosure.
Figure 4:
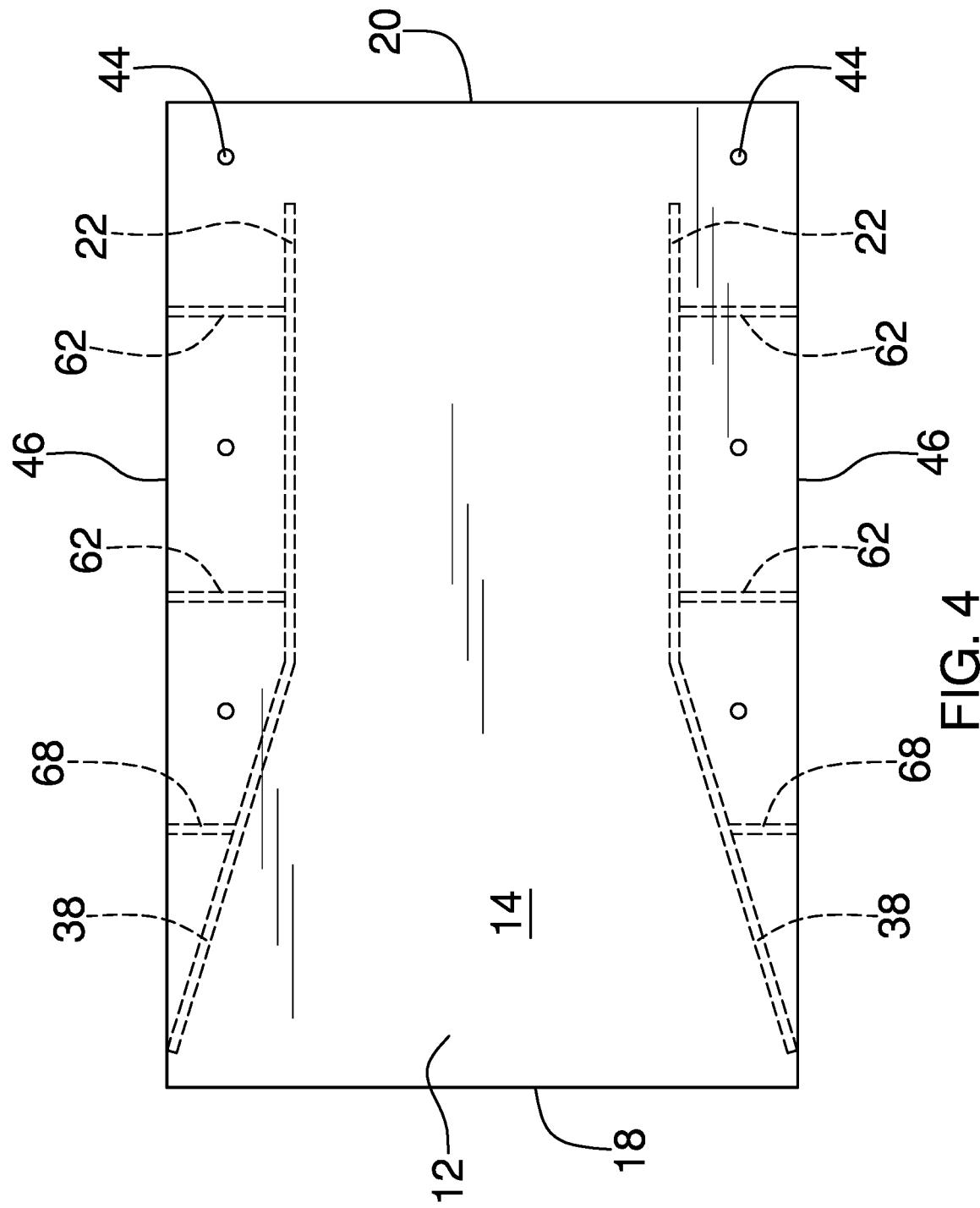
FIG. 4 is a bottom view of an embodiment of the disclosure.
Figure 5:
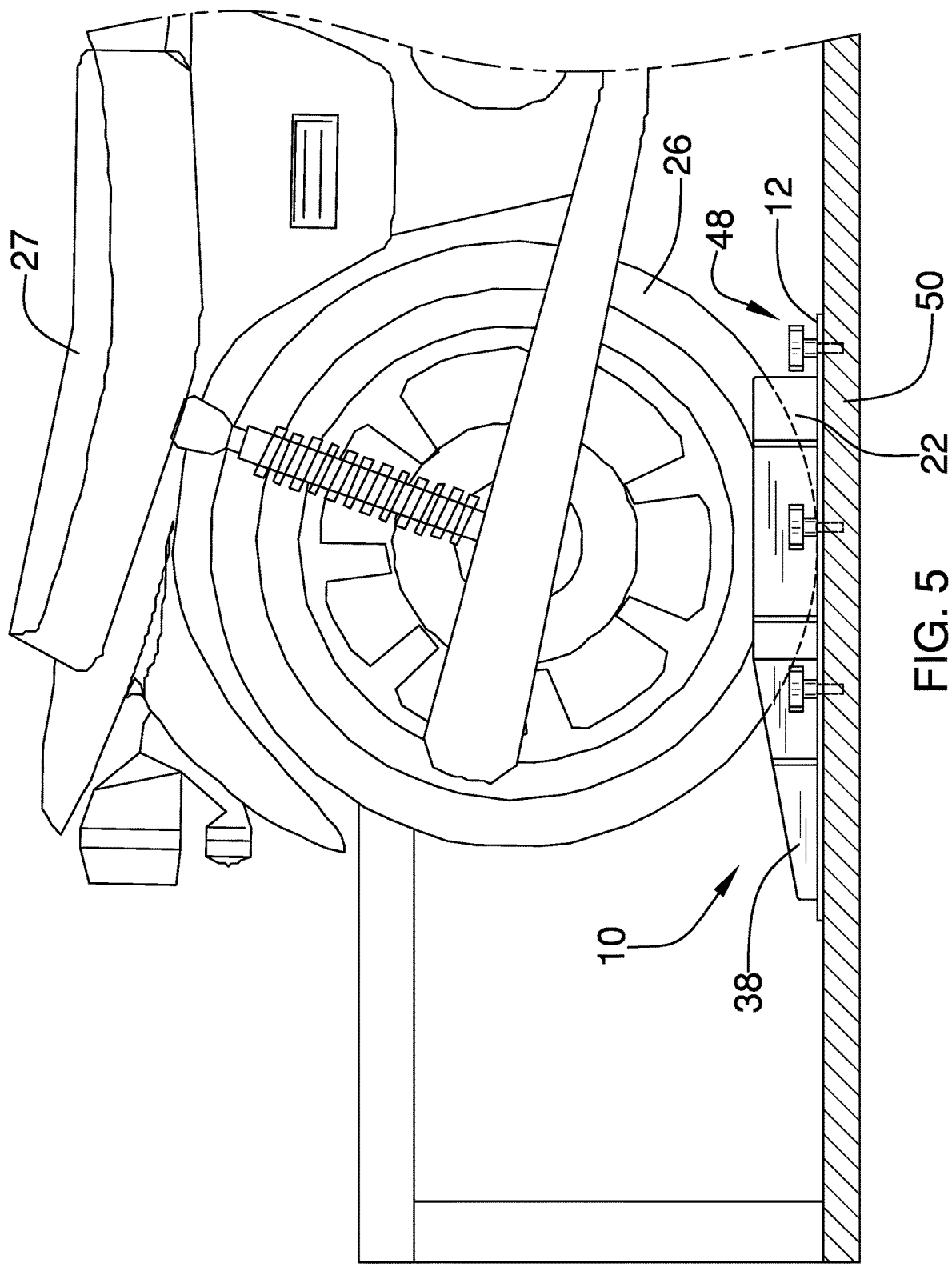
FIG. 5 is a side view of an embodiment of the disclosure in use.
Figure 6:
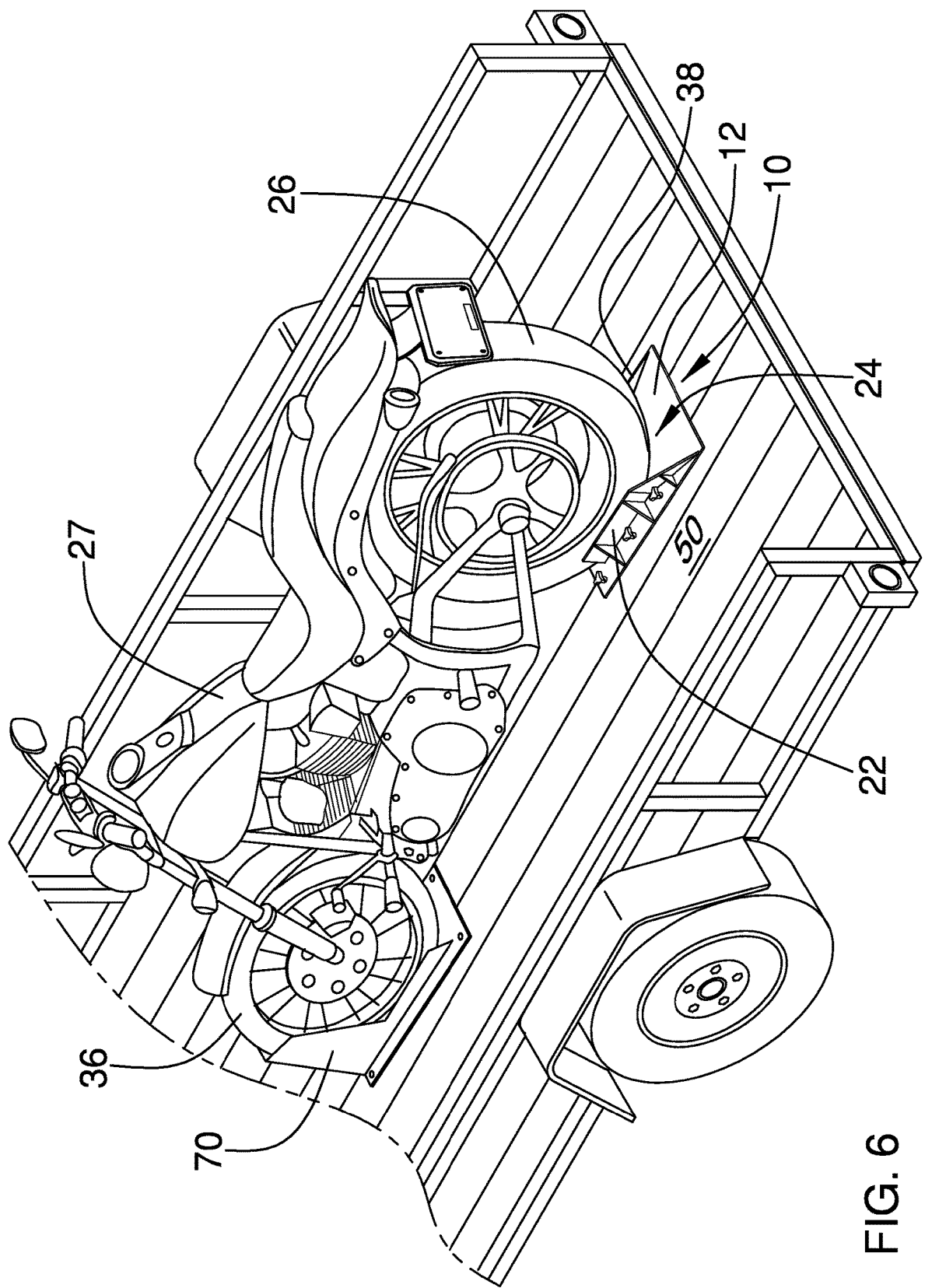
FIG. 6 is a top rear side perspective view of an embodiment of the disclosure in use.

With reference now to the drawings, and in particular to FIGS. 1 through 6 thereof, a new chock device embodying the principles and concepts of an embodiment of the disclosure and generally designated by the reference numeral 10 will be described.

As best illustrated in FIGS. 1 through 6, the vehicle wheel lateral chock device 10 generally comprises a base plate 12 having a bottom surface 14 and an upper surface 16. The base plate 12 has a forward edge 18 and a rearward edge 20.

Each of a pair of side plates 22 is coupled to the base plate 12. The side plates 22 extend upwardly from the upper surface 16 of the base plate 12. The side plates 22 are parallel to each other and spaced apart on the base plate 12 to define a seat channel 24 configured to receive a wheel 26 of a vehicle 27 between the side plates 22. Thus, the side plates 22 are configured for inhibiting lateral movement of the wheel 26 of the vehicle 27 on the base plate 12. Each of the side plates 22 extends perpendicularly from the upper surface 16 of the base plate 12. Each of the side plates 22 has a front edge 28 and a rear edge 30. The front edge 28 of each of the side plates 22 is spaced from the forward edge 18 of the base plate 12. The rear edge 30 of each of the side plates 22 is spaced from the rearward edge 20 of the base plate 12. Each side plate 22 has a top edge 32. The top edge 32 extends between the front edge 28 and the rear edge 30. The top edge 32 is parallel to the upper surface 16 of the base plate 12. The seat channel 24 is open at opposite ends 34 of the seat channel 24 wherein the seat channel 24 is configured for positioning the wheel 26 of the vehicle 27 between the side plates 22 after a different wheel 36 of the vehicle 27 is moved through the seat channel 24.

Each of a pair of guide plates 38 is coupled to the base plate 12. Each guide plate 38 extends from the front edge 28 of an associated one of the side plates 22 towards the forward edge 18 of the base plate 12. The guide plates 38 are angled relative to the side plates 22 such that the guide plates 38 taper extending inwardly towards the side plates 22 from the forward edge 18 of the base plate 12. Each of the guide plates 38 is further angled to extending away from the upper surface 16 of the base plate 12 and outwardly away from a center line of the base plate 12. Each of the guide plates 38 has an uppermost edge 40. The uppermost edge 40 of each of the guide plates 38 is angled relative to the upper surface 16 of the base plate 12 such that a height of the guide plate 38 tapers extending forwardly from the associated one of the side plates 22. Each guide plate 38 has a front end 42. The front end 42 of each guide plate 38 is spaced from the forward edge 18 of the base plate 12.

The base plate 12 has a plurality of connection holes 44 extending through the base plate 12. Each of the connection holes 44 is positioned between an associated one of the side plates 22 and an associated one of a pair of lateral edges 46 of the base plate 12. Thus, each of the connection holes 44 is positioned outside of the seat channel 24. The upper surface 16 of the base plate 12 is planar, smooth, and continuous between the side plates 22, between the guide plates 38, and between the forward edge 18 and rearward edge 20 through the seat channel 24.

Each of a plurality of fasteners 48 is extendable through an associated one of the connection holes 44. Each of the fasteners 48 is configured for coupling to a support surface 50 wherein the plurality of fasteners 48 is configured for securing the base plate 12 in a fixed position on the support surface 50. Each fastener 48 has a threaded shaft 52 extending from a head 54. The head 54 of each fastener 48 having a plurality of projections 56 extending from a central hub portion 60 wherein each fastener 48 is configured to facilitate tightening of the fastener 48 by a hand of a user.

Each of a plurality of side plate brackets 62 is coupled to the base plate 12 and an associated one of the side plates 22. The side plate brackets 62 are parallel and spaced apart from each other. Each of the connection holes 44 is spaced from adjacently positioned side plate brackets 62. Each side plate bracket 62 is triangular having a exterior edge 66 extending from the top edge 32 of the side plate 22 to the associated lateral edge 46 of the base plate to facilitate access to the head 54 of each fastener 48. Each of a pair of guide plate brackets 68 is coupled to the base plate 12 and an associated one of the guide plates 38. Each of the guide plate brackets 68 is also triangular in shape and spaced from an adjacently positioned connection hole 44 to facilitate access to the fasteners 48.

In use, a conventional wheel chock 70 may be fixed to the support surface 50, typically a floor of a trailer or the like. The base plate 12 is fixed to the support surface 50 spaced rearwardly from the conventional wheel chock 70 so that the wheel 26 of the vehicle 27 will be positioned within the seat channel 24 when the different wheel 36 is engaged to the conventional wheel chock 70. The different wheel 36 of the vehicle 27 may pass through the seat channel 24 with minimal resistance given the smooth continuous structure of the upper surface 16 of the plate 12. This prevents having to either direct the different wheel 36 around a conventional style chock which does not allow for pass through, or installing a second conventional style chock on the support surface 50 after the different wheel is moved past the position where the wheel 26 of the vehicle will be positioned when the different wheel is engaged to the conventional wheel chock 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle wheel lateral chock device comprising:

a base plate having a bottom surface and an upper surface, said base plate having a forward edge and a rearward edge;

a pair of side plates coupled to said base plate, said side plates extending upwardly from said upper surface of said base plate, said side plates being parallel to each other and spaced apart on said base plate to define a seat channel configured to receive a vehicle wheel between said side plates wherein said side plates are configured for inhibiting lateral movement of the vehicle wheel on said base plate, each of said side plates extending perpendicularly from said base plate, each of said side plates having a front edge and a rear edge, said front edge of each of said side plates being spaced from said forward edge of said base plate, said rear edge of each of said side plates being spaced from said rearward edge of said base plate, each side plate having a top edge, said top edge extending between said front edge and said rear edge, said top edge being parallel to said upper surface of said base plate, said seat channel being open at opposite ends of said seat channel wherein said seat channel is configured for positioning the vehicle wheel between the side plates after a different wheel of the vehicle is moved through said seat channel;

a pair of guide plates coupled to said base plate, each guide plate extending from said front edge of an associated one of said side plates towards said forward edge of said base plate, said guide plates being angled relative to said side plates such that said guide plates taper extending inwardly from said forward edge of said base plate, each of said guide plates being angled to extending away from said upper surface of said base plate and outwardly away from a center line of said base plate, each of said guide plates having an uppermost edge, said uppermost edge of each of said guide plates being angled relative to said upper surface of said base plate such that a height of said guide plate tapers extending forwardly from said associated one of said side plates, each said guide plate having a front end, said front end of each said guide plate being spaced from said forward edge of said base plate;

said base plate having a plurality of connection holes extending through said base plate, each of said connection holes being positioned between an associated one of said side plates and an associated one of a pair of lateral edges of said base plate wherein each of said connection holes is positioned outside of said seat channel;

a plurality of fasteners, each of said fasteners being extendable through an associated one of said connection holes, each of said fasteners being configured for coupling to a support surface wherein said plurality of fasteners is configured for securing said base plate in a fixed position on the support surface, each fastener having a threaded shaft extending from a head, said head of each fastener having a plurality of projections extending from a central hub portion wherein each fastener is configured to facilitate tightening of said fastener by a hand of a user;

a plurality of side plate brackets, each of said side plate brackets being coupled to said base plate and an associated one of said side plates; and a pair of guide plate brackets, each of said guide plate brackets being coupled to said base plate and an associated one of said guide plates.

\* \* \* \* \*